United States Patent [19]

Huang

[11] Patent Number: 5,309,267
[45] Date of Patent: May 3, 1994

[54] OPTICAL COMMUNICATION SYSTEM USING A SAGNAC SWITCH

[75] Inventor: Alan Huang, Middletown, N.J.

[73] Assignee: AT&T Bell Laboratories, Murray Hill, N.J.

[21] Appl. No.: 950,521

[22] Filed: Sep. 25, 1992

[51] Int. Cl.⁵ .................... H04B 10/02; H04J 14/08
[52] U.S. Cl. ............................. 359/139; 359/176;
359/174; 359/179; 359/158; 375/4
[58] Field of Search ............ 359/174, 175, 176, 177,
359/179, 128, 129, 131, 132, 139, 158; 375/4

[56] References Cited

U.S. PATENT DOCUMENTS

| | | | |
|---|---|---|---|
| 3,705,307 | 12/1972 | Reeves et al. | 359/176 |
| 4,527,286 | 7/1985 | Haworth | 359/176 |
| 4,543,664 | 9/1985 | Couch | 359/176 |

Primary Examiner—Richard E. Chilcot, Jr.
Assistant Examiner—Raphael Bacares
Attorney, Agent, or Firm—John A. Caccuro

[57] ABSTRACT

An optical communication system is implemented using a Sagnac switch to generate a new data signal from a received deteriorated data signal using a clock signal which operates in frequency synchronism but not in phase synchronism with the received data signal. In another embodiment, an optical communication system is implemented by stretching out the loop of the Sagnac switch so that the system transmitter includes the control signal coupler of the Sagnac switch, the receiver includes the combining coupler of the Sagnac switch and the loop becomes the optical communication path connecting the transmitter and receiver.

20 Claims, 3 Drawing Sheets

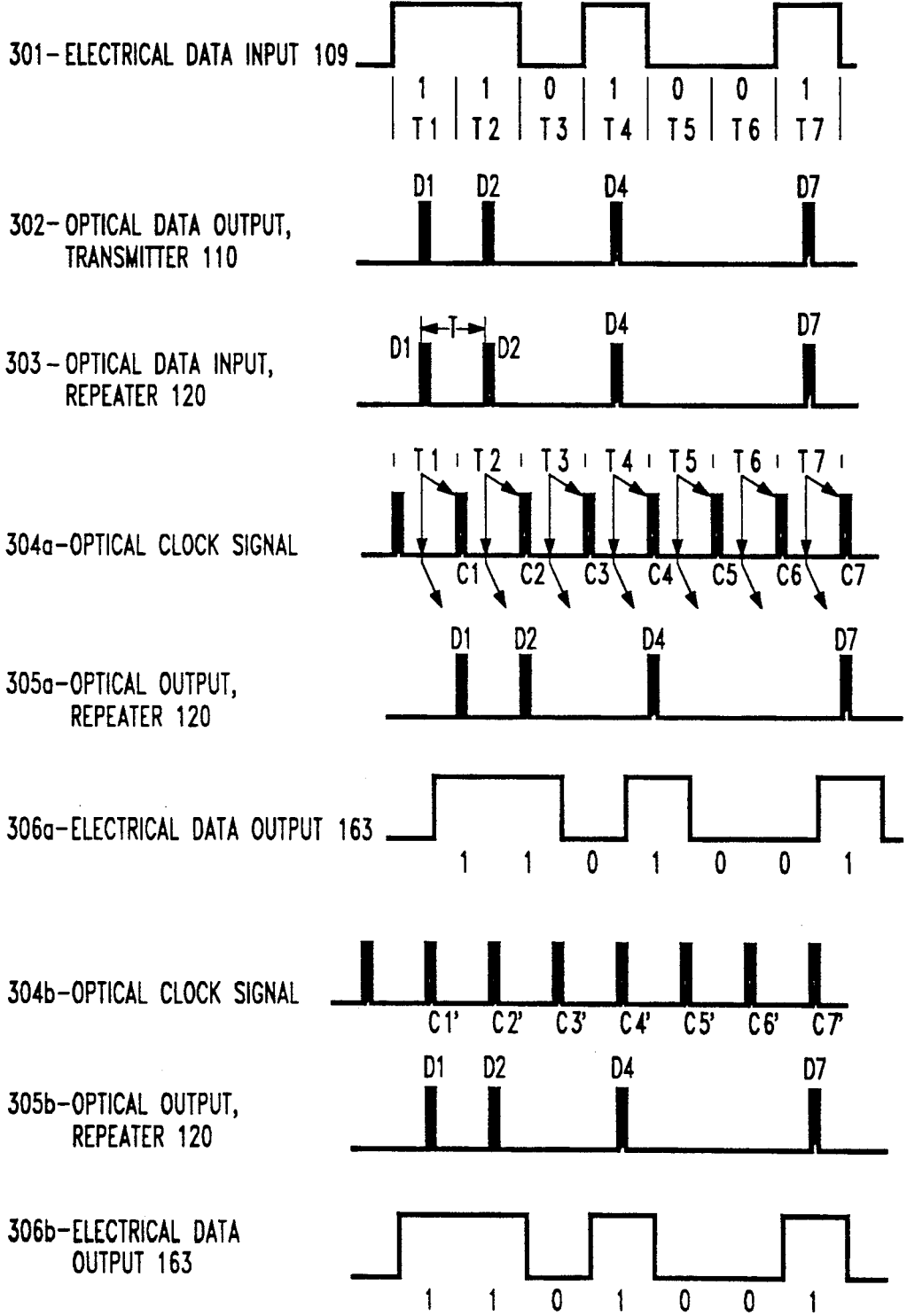

OPTICAL COMMUNICATION SYSTEM USING A SAGNAC SWITCH

BACKGROUND OF THE INVENTION

This invention relates to optical communication circuits and, more particularly, to an all-optical repeater for use in an optical communication system.

The most important feature of optical digital signal transmission is the ability to reconstruct the transmitted pulse train after it has traveled through a dispersive and noisy medium (free-space, optical fiber, etc.). This process of reconstructing the pulse train is performed at intervals along the transmission path by regenerative repeaters.

In prior art optical communication system repeaters, received optical signals are converted to electrical signals, processed using well-known electronic circuits and then converted to optical signals for transmission. As bit rates increase, the expense and complexity of performing regeneration electronically rise dramatically. The initial design is much more difficult at high speeds, and the extreme reliability required of telecommunications repeaters compounds the cost. Thus, there is a continuing need to improve the performance of optical regenerators.

SUMMARY OF THE INVENTION

I have recognized that an optical communication system can be implemented using a Sagnac switch to generate a clean new data signal from a received deteriorated data signal and a clock signal which operates in frequency synchronism but not in phase synchronism with the received data signal. According to the invention, this enables the clock signal to be derived from a source other than the received data signal. The Sagnac switch includes a controllable propagation speed medium exhibiting a dual-speed characteristic. A characteristic (e.g., wavelength or polarization) of the data signal is selected so that it transits the medium at a first speed and a characteristic of the clock signal is selected so that it transits the medium at a second speed. This ensures that, irrespective of the phase synchronization between the data signal and clock signal, they will traverse each other as they travel through the medium. This enables the Sagnac switch to substitute a fresh clock pulse for each received data pulse. In this manner, the data pattern of the received deteriorated data signal is replicated in the clock signal to produce a new data signal.

In another embodiment of the present invention, the loop of the Sagnac switch itself is used as the optical communication path between a transmitter and receiver location. In essence, the various parts of the Sagnac switch are distributed to become the transmitter, communication path and receiver of the communication system. In this embodiment, the data signal is injected into the loop at the transmitter location and the clock signal is injected into the loop at the receiver location. Thus, each pulse of the receiver clock signal travels back to the transmitter to sense if a pulse of the data signal has been injected into the loop medium. As described previously, the Sagnac switch then substitutes a clock pulse for each sensed data pulse.

Because the all-optical repeaters and receivers of the present invention eliminate the need for an electronic clock recovery circuit (including an optical signal detector, decision circuit band-pass filter, and laser) they have no electronic circuit limitations on their data rate.

BRIEF DESCRIPTION OF THE DRAWING

In the drawing,

FIG. 3 shows illustrative signal waveforms useful in understanding the present invention.

DETAILED DESCRIPTION

Figure 1:
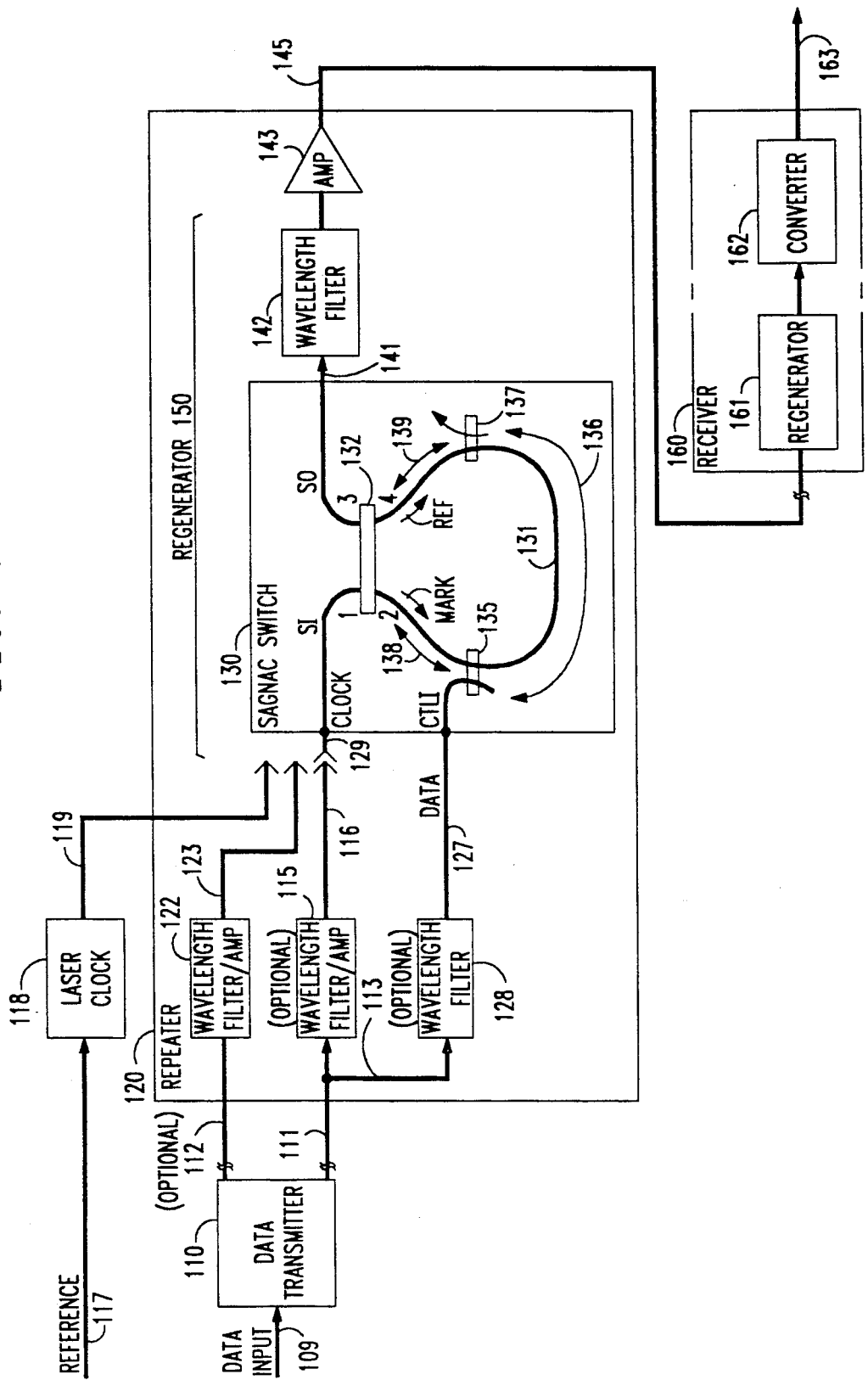
FIG. 1 shows a block diagram of an illustrative optical communication system including a repeater implemented in accordance with the present invention.

In the following description, each item or block of each figure has a reference designation associated therewith, the first number of which refers to the figure in which that item is first located (e.g., 130 is located in FIG. 1 and 202 is located in FIG. 2).

Shown in FIG. 1 is an illustrative block diagram of my all-optical communication system including an optical data transmitter 110; one or more repeater links including optical fiber link 111 and optical data repeater 120; optical fiber link 145; and optical data receiver 160. The optical repeater 120 and optical data receiver 160 may include my optical regenerator for regenerating optical data signals. In a well-known manner, optical data transmitter 110 generates optical data output signal 302 shown in FIG. 3 from the electrical input data signal 301 on input data lead 109. Optical fiber link 111 is a dispersive and noisy medium which distorts the transmitted optical data signal 302 producing the distorted optical data signal 303 which is inputted to repeater 120. It should be noted that an optical transmission medium other than optical fiber, e.g., a free-space medium, may also be utilized for link 111.

Repeater 120 includes regenerator 150 to regenerate or replicate the data pattern of optical input data signal 303 in clock signal 304$a$ thereby producing a clean new optical output signal 305$a$, which is subsequently transmitted over optical fiber link 145 to data receiver 160. Data receiver 160 detects the received optical data signal and converts it to electrical signal 306$a$ which is outputted on data output lead 163.

The repeater 120 may be implemented to utilize a clock signal derived from a variety of sources. Optionally, in Case 1 the clock signal is derived from a local clock source 118 and is received over lead 119. Clock 118 is synchronized by a reference signal, such as an atomic clock signal, received over reference lead 117. Obviously, the laser clock 118 can be incorporated as part of repeater 120.

Optionally, in Case 2, the data transmitter 110 sends a clock signal having an optical wavelength which is different from the wavelength of the received data signal over an optical fiber link 111. In this arrangement, an appropriate wavelength filter and optical amplifier (e.g., erbium amplifier) 115 is used to selectively extract and recondition or restore the clock signal received over link 111. The clean clock signal is then outputted on clock lead 126. Another wavelength filter 128 is used to selectively obtain the received data signal from link 111 for output over lead 127.

Optionally, in Case 3 a separate optical fiber link 112, which connects data transmitter 110 to repeater 120, provides an optical communication path over which a common clock signal can be received. The wavelength filter and amplifier 122 extracts and reconditions the clock signal, the clean clock signal being outputted on lead 123. Whichever of the above-described optional clock sources is selected, its associated clock lead 119, 116 or 123 will be connected to clock input 129 of Sagnac switch 130. It should also be noted that the same above-described clock implementation techniques may also be utilized at receiver 160 and other regenerators utilized in the system of FIG. 1.

Aside from the clock circuits, optical repeater 120, illustratively, also includes a regenerator 150 (Sagnac switch 130 and wavelength filter 142) and amplifier 143. The optional wavelength filter 142 prevents any portion of the deteriorated optical data signal 127, which is not removed by coupler 137, from corrupting the regenerated data signal 141. Optical amplifier 143 amplifies the regenerated data signal to the proper level for transmission over fiber link 145. Optical amplifier 143 may be an erbium amplifier or other type of optical amplifier.

In the following description we assume that the laser clock 118 provides the clock signal over lead 119 to repeater 120. The optical clock signal 119 and received optical data signal 127 provide inputs to Sagnac switch 130. Such a Sagnac switch is described in more detail in the co-pending United States patent application, Ser. No. 07/521,774 of Gabriel, Houh and Whitaker entitled "Sagnac Optical Logic Gate," filed May 10, 1990, which is incorporated by reference herein.

The Sagnac switch 130 provides several characteristics which are desirable for use in optical repeater 120. For example, as will be described in more detail in later paragraphs, Sagnac switch 130 is insensitive to timing jitter, amplitude jitter, pulse shape and wavelength chirp. Additionally, the AND logic function performed by Sagnac switch 130 on the signals applied to its clock and control (CTLI) ports enable it to substitute a fresh clock pulse, of the clock signal 129, for each deteriorated received data pulse. The resulting repeater 120 thus possesses desirable timing jitter, amplitude jitter, wavelength chirp and pulse shape restoration characteristics. Optical repeater 120 effectively regenerates and transmits a data output signal over fiber link 145 having the original characteristics of the data signal transmitted from data transmitter 110.

Sagnac switch 130, illustratively, includes an optical transmission medium, i.e., optical fiber 131(including segments 138, 136 and 139) that is connected at both ends to a Polarization Maintaining Coupler (PMC) 132. An input optical clock signal 129 is applied to an input SI which is port 1 of coupler 132. Ports 2 and 4 of coupler 132 are connected to the two ends of fiber 131, and port 3 of coupler 132 forms an output SO of the Sagnac loop. Fiber 131 thus forms a loop, (also referred to herein as fiber loop 131) which in the context of this disclosure, refers to the path over which a signal travels and, more particularly, to arrangements where the path forms a closed, or nearly closed, figure.

The Sagnac switch 130 operates as follows. Clock signal 129 is applied to port 1 and is split into two parts that exit coupler 132 at ports 2 and 4: a "mark" signal (interaction signal) that travels counter-clockwise, and a "ref" signal (reference signal) that travels clockwise. The "mark" and "ref" signals travel through the loop in opposite directions, re-enter coupler 132 and recombine therein. Under normal circumstances, the "mark" and "ref" signals experience the same conditions as they travel through the loop. Even though the propagation speed is a function of many parameters that may be uncontrollable and may or may not change with time, the travel time of the "ref" and "mark" signals is short enough that, basically, all of the parameters remain static. Consequently, no changes occur within the loop to differentiate between the effects of the fiber on the signals traveling in the two directions. The result is a combining of signals in coupler 132 that is constructive with respect to port 1 and destructive with respect to port 3. In consequence, light that enters port 1 of coupler 132 is completely reflected back to port 1, and no output is delivered to port 3. The above paragraphs describe the operation in the absence of a control signal at port CTLI.

In addition to the above-described structure, Sagnac switch 130 includes a wavelength coupler 135 that injects a control signal (data signal 127 in our embodiment) at port CTLI into a segment 136 of the fiber loop 13 1. Because coupler 135 is within loop 131, the data signal 127 travels along loop 131 only in one direction; and more specifically, coupler 135 is arranged to inject the control signal that travels along loop 131 in the direction of the "mark" signal. A wavelength combining coupler 137 may also be included within the loop of fiber 131 to extract the data signal 127 out of the loop once it has served its control function.

Segment 136 of fiber 131 is a variable refractive-index material that is characterized by the property that the propagation speed of a beam passing through the material is a function of the intensity of the beam that passes through the material. Furthermore, not only does the propagation speed change for the beam (e.g., data signal 127) that effects the change in propagation speed, but it also changes the propagation speed of other beams (e.g., "mark" signal) that pass through the material at the same time. The nonlinear interaction between the data signal 127 and the "mark" signal is by means of cross-phase modulation due to the optical Kerr effect. Of course, the entire length of fiber 131 may be made of such a variable refractive-index material, but for the sake of generality, fiber 131 is drawn as having only a limited segment 136 being made up of this material. Also for the sake of generality, it should be pointed out that the loop of fiber 131 in FIG. 1 does not necessarily have to be fiber. It can be a waveguide, or other means for directing the flow of light.

In sum, the Sagnac switch 130 includes a fiber loop 131 having a controllable propagation speed material in segment 136; "mark" and "ref" signals traveling through the loop in opposite directions and combined in coupler 132;, and a data signal 127 that is injected at coupler 135 which travels in the same direction as the "mark" signal over segment 136 and is extracted by coupler 137. When the "mark" and data signal 127 are properly timed and conditioned, the result is a single-pole double-throw switch type apparatus. When data signal 127 is not present, the "mark" and "ref" signals are combined in coupler 132 as described above. The signal entering the switch at port 1 reflects out of the loop of fiber 131 and exits port 1 of coupler 132. However, when the data signal 127 is present and is made to travel through segment 136 with the "mark" signal, the change in propagation speed of the "mark" signal that is caused by the control signal alters the phase of the "mark" signal arriving at coupler 132. When the energy in data signal 127 and the interaction interval within segment 136 (between the "mark" and data signal 127) are properly controlled, the resulting phase relationship between the "mark" (or "interaction") and "ref" signals is approximately $\pi$ radians, meaning that the "mark" signal is about 180° out-of-phase to the "ref" signal. This causes the combining of the "mark" signal and the "ref" signal in coupler 132 to be completely destructive with respect to port 1 and completely constructive with respect to port 3. As a result, all of the energy exits at port 3 (non-reflected signal output port) rather than at port 1 (reflected signal output port). Thus, the existence of a received data signal 127 causes coupler 132 to substitute a clock signal for that received data signal at output port 3. It may be noted in passing that the "ref" signal also passes through segment 136 and that its speed is also somewhat affected by data signal 127. But, since data signal 127 and the "ref" signal travel in opposite directions, their interaction time is much shorter than the interaction time of the "mark" and data signal 127.

To ensure the proper operation of the Sagnac switch 130 that is to minimize the distortion of the pulse which outputs at port 3, requires data signal 127 to completely traverse the "mark" signal during its transit through segment 136 of the fiber loop 131. This is accomplished by requiring the material of segment 136 to have a dual speed characteristic, one that propagates the data signal 127 at a different rate than the "mark" (clock) signal. The difference in the propagation speed may be tied to any controllable parameter of data signal 127, such as wavelength, intensity or polarization. In the illustrative embodiment different wavelengths are utilized. That is, the wavelength of laser clock 118 signal ($\lambda 1$) is different than the wavelength ($\lambda 2$) of the input data signal 127.

As long as input data signal 127, which acts as the control signal, completely traverses the "mark" signal (generated from laser 125 clock signal) within segment 136 the Sagnac switch 130 operation is completely insensitive to the shape of the control signal or its precise timing. Rather, it is only sensitive to the overall energy of the data signal 127 (integral of a data pulse).

In the present embodiment, data signal 127 has the same clock rate as the clock signal 129. As previously noted, however, the data signal 127 and clock signal 129 have different wavelengths. Segment 136 is selected to have a controllable parameter based on wavelength; thus, fiber loop 131 is formed from dispersive fiber. The wavelength of the data signal 127 is selected to be at a wavelength which transits segment 136 at a travel speed which is different from the speed for the wavelength of clock signal 129. The data signal 127 wavelength and the clock signal wavelength are chosen with the fiber dispersion to give sufficient differential travel speed such that the control and clock pulses completely traverse one another over the length of fiber 136. For example, we assume that the data signal 127 is selected to be at the "fast" wavelength; hence, the clock signal must enter the loop 131 first. This is shown by 304a and 303 in FIG. 3. Thus, data signal 127 can traverse or "slip" past the "mark" signal within the length of segment 136, even though the "mark" signal precedes the entrance of the control signal into segment 136.

It should be noted again that in my example, the wavelength of the regenerated data signal, e.g., 305a, ($\lambda 1$, since it is an encoded clock signal 304a) outputted to fiber link 145 is different from the wavelength (e.g., $\lambda 2$) of the deteriorated optical input data signal 303 received over fiber link 111. Thus, regenerator 150 can be viewed as a circuit which converts data signals at wavelength $\lambda 1$ to data signals at wavelength $\lambda 2$. If a communication system needs two repeaters and if the $\lambda 1$ to $\lambda 2$ repeater 120 is followed by a $\lambda 2$ to $\lambda 1$ repeater (not shown), then the wavelength of the data signal will be restored to $\lambda 1$.

The ability of repeater 120 to replicate input data signal 127 is due to the ability of the Sagnac switch 130 to compensate for amplitude jitter, timing jitter, frequency jitter, and pulse shape distortion in the loop 131. The insensitivity to timing jitter occurs because of the speed differential between signals travelling at different speeds in loop 131. This has been thoroughly described in the previously referenced patent application of Gabriel et al. The tolerance to timing jitter is achieved by controlling the dispersion characteristic of the fiber in the loop and the length of the fiber. The timing jitter tolerance should be chosen to be large enough to absorb timing jitter in the clock laser source 118, as well as any timing mismatches due to slight errors in the length of the delay around the Sagnac switch 130.

The insensitivity to amplitude jitter is due to the sinusoidal dependence of the transmission on the control energy due to the interference which takes place in the Sagnac switch interferometer. The energy of the logic 0 pulse should be controlled to produce a nonlinear phase shift in the Sagnac loop which is substantially less the $\pi/4$ radians. The energy of the logic 0 pulses is determined in part by imperfections in the fiber circuit (such as an imperfect splitting ratio of the 50:50 coupler of the Sagnac, or imperfections in the polarization properties of the polarization sensitive couplers in the Sagnac switch), so can generally be kept low by careful construction of the circuit. The energy of the logic 1 pulses should be sufficient to give a nonlinear phase shift which is between approximately $\pi$ and $3\pi/2$, to ensure that the switch operates in a stable regime.

With reference to FIG. 3, I describe the transit of input data signal 127 (as shown by 303) past the "mark" clock signal in segment 136. (Note the "mark" clock signal has the same timing as the clock signal, shown by 304a and 304b). The data input signal 303 comprises a logic 1 data bit D1, D2, D4 and D7 located in time slots T1, T2, T4 and T7, respectively, the remaining time slots having a logic 0 signal therein.

I assume that the speed differential (slip) of data signal 303 over "mark" clock signal (304a or 304b) is such that it can, during the transit through segment 136, gain T seconds on the "mark" clock signal. The value T is illustrated on data signal 303. Consequently, if the value of T is equal to the period of the clock signal, a data bit pulse (e.g., D1) of data signal 303 will always traverse one clock pulse (e.g., C1 of 304a). Thus, the clock signal can be introduced into Sagnac switch 130 either: 1) in phase synchronism with the data signal 303, 2) before the data signal (as shown by 304b) or 3) about T seconds before the data signal (as shown by 304a). Consequently, proper operation of the Sagnac switch 130 requires that the clock signal only be in frequency synchronization, but not necessarily in phase synchronization, with the data signal.

In actuality, if the "slip" between the "mark" clock signal and data signal 303 is equal to the period T of the clock signal then the resulting "speeding up" of the "mark" signal is the same irrespective of the phase synchronization between the "mark" signal and the data signal 303. Thus, if the "mark" signal travels faster (in segment 136) than the data signal 303, each pulse of the data signal 303 would effectively be traversed by a pulse of the "mark" signal. In situations where the "mark" signal and data signal 303 are introduced in Sagnac switch 130, so that their pulses initially overlap, then one part of data signal 303 would be traversed by a first part of a first "mark" signal pulse and the other part of data signal 303 would be traversed by a second part of a second "mark" signal pulse (which follows the first mark signal pulse). Thus, in this situation each pulse of data signal 303 is still effectively traversed by a pulse of a "mark" signal.

Similarly, if the data signal 303 is faster than the "mark" signal (to produce a slip period T) then each pulse of the data signal 303 also is traversed by a pulse of a "mark" signal. Again, this traversing may occur over one pulse of the it "mark" signal (when the "mark" signal pulses and data signal 303 pulses do not overlap when injected into Sagnac switch 130) or over two consecutive pulses of the "mark" signal (when the "mark" signal pulses and data signal 303 pulse overlap when injected into Sagnac switch 130). Because of the traverse of a "mark" clock bit by a logic 1 data bit, the "mark" clock bit is "speeded-up" relative to the "ref" clock bit by about 180°. As previously discussed, this means that the "mark" clock bit is about 180° out-of-phase with the "ref" clock bit causing constructive interference in coupler 132, with the result that a clock bit exits at port 3 of coupler 132. Thus, a clock bit appears at port 3 only when logic 1 data bit traverses a "mark" clock bit. Thus, Sagnac switch 130 substitutes a fresh clock pulse for each deteriorated logic 1 data bit. In this manner, Sagnac switch 130 thereby regenerates or encodes the data pattern of the received data signal into the clock signal. Hence, a bit (e.g., D1) of data input signal encodes the clock bit (e.g., C1 or C') which immediately precedes it by up to T seconds. As shown in FIG. 3, data input signal 303 acts on an illustrative clock signal 304a to produce output signal 305a which results in electrical data output signal 306a. Similarly, data input signal 303 acts on another illustrative clock signal 304b to produce output signal 305b and electrical data output signal 306b. Thus, as shown in FIG. 3 and in accordance with the present invention, the clock signal (304a or 304b) does not have to be in phase synchronization with data input signal (303), but only needs to be in frequency synchronization therewith.

It should be noted that the same result, as described above, occurs if the characteristics of the clock and data signal are selected so that the "mark" clock signal travels faster than, and traverses, the data signal within segment 136.

Figure 2:
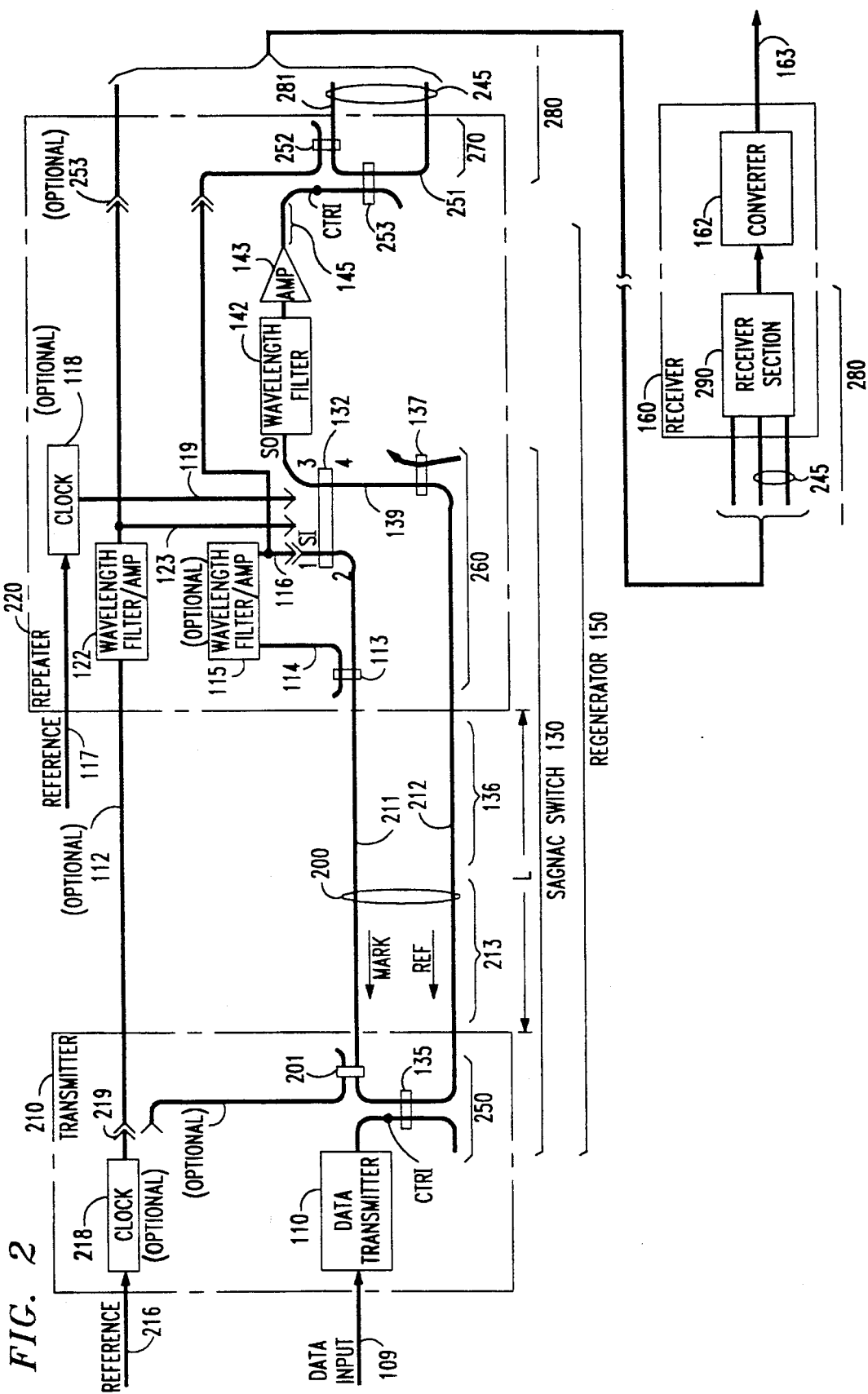
FIG. 2 shows a block diagram of another illustrative embodiment of a communication system in accordance with the present invention.

Shown in FIG. 2 is a block diagram of another illustrative embodiment of a communication system incorporating my invention. In the following description, the components which have the same designation in FIG. 2 as those in FIG. 1 operate in the same manner.

I have recognized that since the fiber loop 131 of a Sagnac switch is typically about a thousand meters long, the fiber loop 131 itself can be utilized as the optical fiber link (e.g., 111) which interconnects a transmitter location and a receiver location. In essence, according to my invention, various parts of the Sagnac switch 130 are distributed into transmitter section 250, a receiver section 260 and the communication path or link 200 therebetween. As shown in FIG. 2, the coupler 135 is part of the transmitter section 250 and the control port (CTRl) thereof serves to receive the data input signal. The couplers 132 and 137 are located in the receiver section 260. Port 3 of coupler 132 serves as the output port SO of Sagnac switch 130. The fiber loop 131 which is typically fiber wound on a spool, is unwound and laid-out to form the optical fiber communication link 200 (including paths 211 and 212). Hence, fiber loop 131 is arranged in an elongated loop where the open end is located at the receiver section 260 and the closed end of the loop is located at the transmitter section 250. In such an arrangement, the path 212 would include the variable-index material segment 136, and path 211 would be a standard optical fiber medium segment 138. If the length L of link 200 is desired to be longer than the segment 136, then link 200 would include a standard optical fiber segment 213. Recall that the length of segment 136 needed for a Sagnac switch to function properly depends on the previously discussed factor such as the type of controllable propagation speed material used, data signal rate, signal intensity levels, variable refractive-index material used, etc.

In the arrangement of FIG. 2 the regenerator 150 now functions as an optical fiber link 200 as well as a data signal regenerator. Repeater 220 may then be formed by using the receiver section 260 of Sagnac switch 130, wavelength filter 142, amplifier 143, and the fiber link 145 (a short link in this embodiment) which connects to the transmitter section 270 of the next Sagnac switch 280. The output SO of Sagnac switch 130 is then filtered by filter 142, amplified by amplifier 143 and coupled via coupler 253 to path 151 of fiber link 245.

The transmitter unit 210 may then include the data transmitter 110 and the transmitter section 250 of Sagnac switch 130. The receiver unit 160 would then include the receiver section 290 of Sagnac switch 280 and the data converter 162. The fiber loop of Sagnac switch 280 serves as the fiber communication link 245 between the repeater 220 and receiver 160.

The previously described apparatuses utilized to provide the various optional clock arrangements of FIG. 1 are shown in their equivalent locations in the transmitter unit 210 and repeater unit 220 and function in the same manner. One optical clock arrangement, previously referred to as Case 1, includes reference signal 117, laser clock 118 and clock output signal 119. The second optional clock arrangement, Case 2, includes reference signal 216, laser clock 218, clock output signal 219, coupler 201 at transmitter unit 210, path 211, coupler 113, and wavelength filter and amplifier 115 at repeater unit 220. The wavelength filter and amplifier 115 extracts and reconditions the clock signal received over lead 114 from coupler 113. The clean clock signal output 116 of wavelength filter and amplifier 115 provides the Case 2 type clock signal via coupler 252 and path 281 to receiver unit 160. The third optional clock arrangement, Case 3, includes reference signal 216, laser clock 218 and clock output signal 119 at transmitter unit 2 10. Optical fiber link 112 provides a clock signal path to repeater unit 220. At repeater unit 220, wavelength filter and amplifier 122 generates a clean clock signal which is outputted via lead 123 to repeater 220 and via optical fiber link 253 to receiver unit 160.

The operation of a regenerator 150 of FIG. 2 operates as previously described in FIG. 1 and is described in summary as follows. The clock signal enters at port 1 of coupler 132 and forms the "ref" and "mark" clock signals. The clock signal may be obtained from lead 119, lead 123 or lead 116 as previously described. Data signals from data transmitter 110 enter coupler 135 via the CTRl port where they traverse the "mark" clock signals in segment 136 of path 212. The "ref" clock signals are then combined with the "mark" clock signals to form the new data output signal at port 3 of coupler 132.

This data output signal then passes through wavelength filter 142, amplifier 143 and fiber link 145 and serves as the data input to coupler 250 of Sagnac switch 280 of the next repeater section. Note if necessary, multiple repeaters 220 may be utilized in the system of FIG. 2.

The fact that the "mark" and "ref" clock signals, as well as the data signal all travel over the same communication link 200, between the transmitter unit 210 and repeater unit 220, may offer some self-compensation benefits for optical interference that may be introduced into link 200 as well as reduce the effects of strain, temperature, and pressure on link 200.

It should also be noted that the function of Sagnac switch, e.g., 130, may be implemented using a Mach-Zehnder switch or other interferometer switch, using the Kerr effect, and arranged in an analogous manner to that disclosed herein. A polarization controller can be added to the data input port or to the clock input port of the Sagnac switch 130 to prevent polarization wander. In another repeater arrangement, it may be desirable to include a preamplifier and equalizer at the input of the repeater to increase the amplitude and reshape the input data to improve the operating capabilities of the repeater.

In an alternate embodiment, the clock signal 129 can utilize one polarization signal and the control signal 127 (data signal) can be an orthogonal polarization signal. Thus, the data signal 127 couplers 135 and 137 may, illustratively, be polarization directional couplers, which have the same polarization as the data signal, e.g., vertical polarized coupler. And coupler 132, into which clock signal 129 is coupled, may, illustratively, be a horizontal polarization maintaining coupler. Note, the polarization utilized for the interacting signal must be orthogonal to the polarization used for the mark signal. In such an alternate embodiment of FIG. 1, optical fiber 131 would be a polarization maintaining fiber. The birefringence of fiber 131 causes the difference in the propagation speed between the horizontal and vertically polarized signals. Such an embodiment is described in the article entitled "Complete Switching in a Three-Terminal Sagnac Switch" by H. Avramopoulos, et al. *IEEE Photonic Technology Letters*, vol. 3, 1991, pp. 235-237, which is incorporated by reference herein.

What has been described is merely illustrative of the application of the principles of the present invention. Other arrangements and methods can be implemented by those skilled in the art without departing from the spirit and scope of the present invention.

I claim:

1. An optical communication system comprising
   an optical communication path which, when it receives an optical data signal at one end, outputs a deteriorated corresponding optical data signal at a second end;
   means for deriving an optical clock signal from other than said deteriorated data signal, said clock signal having a frequency which is equal to the deteriorated data signal frequency and which is not substantially phase synchronized to said deteriorated data signal;
   means for generating a new optical data signal from said deteriorated data signal, said generator means including
   a controllable propagation speed medium having a first propagation speed for said deteriorated data signal and a second propagation speed for said clock signal, said medium being of a length to ensure that the difference between said first and second propagation speeds results in the faster signal travelling through said medium approximately one clock period time T faster than the slower signal;
   means for injecting said clock signal, into said medium, to develop a propagating interacting signal that travels in said medium in one direction at said second propagation speed and a counter propagating reference signal that travels in said medium in the opposite direction at said second propagation speed;
   means for controllably injecting said deteriorated data signal into said medium, without regard to its timing with respect to said interacting signal, to travel through said medium in the direction of said interacting signal at said first propagation speed, the difference in propagation speed between said deteriorated data signal and said interacting signal causing the deteriorated data signal and the interacting signal to traverse each other while travelling through said medium and
   A means for combining said propagating interaction signal and said counter propagating reference signal after they travel through said medium to generate said new optical data signal by substitution of said clock signal for said deteriorated data signal when said deteriorated data signal and said interacting signal traverse each other while travelling through said medium, so that said new optical data signal has the same data pattern as said deteriorated data signal.

2. The system of claim 1 wherein said controllable propagation speed medium is arranged to form a continuous elongated loop having an open end which terminates at said combining means located at a first location and having a closed end at a second location, said second location including said controllable injecting means and said first location also including said clock signal injecting means.

3. The system of claim 1 wherein said deriving means includes
   means for receiving said clock signal over said path, said clock signal having a wavelength different from the wavelength of said deteriorated data signal.

4. The system of claim 1 wherein said deriving means includes
   means for receiving said clock signal from another location over a second optical communication path.

5. The system of claim 1 wherein said deriving means includes
   means for receiving said clock signal from a local clock source.

6. The system of claim 1 wherein said clock signal has a characteristic which results in said interacting signal developed therefrom travelling through said medium faster than said data signal.

7. The system of claim 1 wherein said data signal has a characteristic which results in said data signal travelling through said medium faster than said interacting signal developed from said clock signal.

8. The system of claim 1 wherein said data signal operates at a first wavelength and said clock signal operates at a second wavelength.

9. The system of claim 1 wherein said interacting signal has a first polarization and said deteriorated data signal has a second polarization.

10. An optical communication system comprising a continuous optical communication medium arranged to form an elongated loop having an open end which terminates at a receiver and having a closed end at a transmitter, said medium having a controllable propagation segment having a dual-speed characteristic;

said transmitter including means for receiving an optical data signal having a characteristic which enables it to travel at a first speed through said controllable propagation segment, and means for injecting said data signal into said medium in a first direction; and said receiver including means for receiving an optical clock signal having a frequency equal to the frequency of said data signal and having a characteristic which enables it to travel at a second speed through said controllable propagation segment, a means for injecting said clock signal into said medium, to develop a propagating interacting signal that travels in said loop medium in said first direction and a counter propagating reference signal that travels in said loop medium in an opposite direction, the timing of said interacting signal in relation to said data signal being such that the interacting signal and the data signal traverse each other, because of the difference in speed of said interacting signal and said data signal, while travelling through said controllable propagation segment and means, connected to said open loop end, for combining said propagating interaction signal and said counter propagating reference signal after they travel through said medium to generate an output data signal by substitution of said clock signal for said deteriorated data signal when said deteriorated data signal and said interacting signal traverse each other while travelling through said medium, so that said output data signal has the same data pattern as said deteriorated data signal.

11. The system of claim 10 wherein the timing of said clock signal is not substantially in phase synchronization with said data signal.

12. The system of claim 10 wherein said receiver includes means for generating said clock signal which is synchronized to a received clock reference signal.

13. The system of claim 10 wherein said transmitter includes means for receiving a transmitter optical clock signal having a wavelength different from the wavelength of said data signal;

means for injecting said transmitter optical clock signal into said loop medium in the opposite direction as said interacting signal, and wherein said receiver includes means for extracting said transmitter clock signal from said loop medium and coupling it to said receiver clock receiving means.

14. The system of claim 10 including a separate optical communication medium connected between said transmitter and said receiver and wherein said transmitter includes means for receiving and injecting a transmitter optical clock signal into said separate medium and said receiver includes means for extracting said transmitter clock signal from said separate medium and coupling it to said receiver clock receiving means.

15. The system of claim 10 wherein said characteristic of said clock signal results in said interacting signal developed therefrom travelling through said controllable propagation segment faster than said data signal.

16. The system of claim 10 wherein said characteristic of said data signal results in said data signal travelling through said controllable propagation segment faster than said interacting signal developed from said clock signal.

17. The system of claim 10 wherein said dual-speed characteristic of said controllable propagation segment is based on signal wavelength and wherein said data signal operates at a first wavelength and said clock signal operates at a second wavelength.

18. The system of claim 10 wherein said dual-speed characteristic of said controllable propagation segment is based on signal polarization and wherein said interacting signal has a first polarization and said deteriorated data signal has a second polarization.

19. An optical repeater comprising a continuous optical communication medium arranged to form a continuous optical communication loop having a closed end at a remote location and an open end which terminates at said repeater, said medium having a controllable propagation segment having a dual-speed characteristic;

means, connected at said open end, for injecting an optical clock signal into said medium, to develop an interacting signal that travels in said loop in the direction of said data signal and a reference signal that travels in said loop in an opposite direction;

means, connected at said open loop end, for combining said reference signal after its travel through said loop with said interacting signal after its travel through said loop to generate an output data signal when said interacting signal arrives at said combining means at least a predetermined time sooner than said reference signal; and means for outputting said output data signal.

20. The repeater of claim 19 wherein said combining means generates a logic zero output data signal when said interacting signal and said reference signal have a phase difference within a predetermined range and generates a logic one output data signal when said interacting signal and said reference signal have a phase difference outside said predetermined range.

* * * * *